United States Patent
Wang et al.

(10) Patent No.: US 10,187,114 B2
(45) Date of Patent: Jan. 22, 2019

(54) METHOD, DEVICE AND SYSTEM FOR ISOLATING SERVICES, DPU AND NETWORK ADAPTER

(71) Applicant: ZTE Corporation, Shenzhen (CN)

(72) Inventors: Xiaojun Wang, Shenzhen (CN); Weiliang Zhang, Shenzhen (CN); Mingming Cheng, Shenzhen (CN); Qi Wei, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 130 days.

(21) Appl. No.: 15/109,289

(22) PCT Filed: Jun. 9, 2014

(86) PCT No.: PCT/CN2014/079537
§ 371 (c)(1),
(2) Date: Jun. 30, 2016

(87) PCT Pub. No.: WO2014/177110
PCT Pub. Date: Nov. 6, 2014

(65) Prior Publication Data
US 2016/0329930 A1    Nov. 10, 2016

(30) Foreign Application Priority Data
Dec. 31, 2013    (CN) .......................... 2013 1 0753506

(51) Int. Cl.
*H04B 3/50*    (2006.01)
*H04B 10/25*    (2013.01)
(Continued)

(52) U.S. Cl.
CPC ............... *H04B 3/50* (2013.01); *H04B 10/25* (2013.01); *H04L 12/10* (2013.01); *H04L 12/2869* (2013.01); *H04M 19/001* (2013.01)

(58) Field of Classification Search
CPC ....................................................... H04B 3/50
(Continued)

(56) References Cited

U.S. PATENT DOCUMENTS 6,148,006 A * 11/2000 Dyke ................... H04M 11/062
370/480
6,827,260 B2 * 12/2004 Stoutenburg ........... G06Q 20/04
235/380

(Continued)

FOREIGN PATENT DOCUMENTS

CN    1298251 A    6/2001
CN    1543165 A    11/2004
(Continued)

OTHER PUBLICATIONS

International Search Report for corresponding application No. PCT/CN2014/079537 filed on Jun. 9, 2014; dated Sep. 29, 2014.
(Continued)

*Primary Examiner* — Gerald Gauthier
(74) *Attorney, Agent, or Firm* — Cantor Colburn LLP

(57) ABSTRACT

Provided are a method, device and system for isolating services, a Distributed Point Unit (DPU), a network adapter. The method includes that: a physical division manner, used for service isolation, of a twisted pair connected between a DPU on an access network side and a network adapter on a user side is determined, wherein the physical division manner includes at least one of: a time division manner, a frequency division manner and a line space division manner; and isolation processing is performed, according to the determined physical division manner, on a Plain Old Telephone Service (POTS) and a reverse power supply service executed on the DPU by user-side equipment, which are transmitted on the twisted pair. By such a method, the problem that the POTS and the reverse power supply service executed on the DPU by the user-side equipment, which are (Continued)

transmitted on the twisted pair, may not coexist in the related art is solved, and the effect of improving a user experience is further achieved.

14 Claims, 12 Drawing Sheets

(51) Int. Cl.
    *H04M 19/00*     (2006.01)
    *H04L 12/10*     (2006.01)
    *H04L 12/28*     (2006.01)

(58) Field of Classification Search
    USPC ............... 370/352, 395.53, 493, 359, 480;
                    375/222, 224; 379/102.04, 413, 414,
                    379/1.03, 93.05; 398/116, 171, 67, 79;
                    235/380; 455/422.1; 702/188; 725/110;
                                      726/4, 10
    See application file for complete search history.

(56) References Cited

U.S. PATENT DOCUMENTS

| | | | |
|---|---|---|---|
| 7,352,803 B2* | 4/2008 | Bremer | H04J 1/12 375/222 |
| 8,543,008 B2* | 9/2013 | Soto | H04M 19/08 398/171 |
| 2002/0063924 A1* | 5/2002 | Kimbrough | H04B 10/272 398/79 |
| 2004/0151168 A1* | 8/2004 | Phillips | H04L 63/02 370/359 |
| 2004/0151290 A1* | 8/2004 | Magarasevic | H04L 63/02 379/93.05 |
| 2004/0153289 A1* | 8/2004 | Casey | G06F 19/3418 702/188 |
| 2004/0153670 A1* | 8/2004 | Casey | H04L 29/06027 726/10 |
| 2004/0172657 A1* | 9/2004 | Phillips | G08B 27/005 725/110 |
| 2005/0022007 A1* | 1/2005 | Phillips | H04L 29/06027 726/4 |
| 2005/0282536 A1* | 12/2005 | McClure | H04W 84/14 455/422.1 |
| 2006/0077968 A1* | 4/2006 | Pitsoulakis | H04M 3/005 370/352 |
| 2006/0159129 A1* | 7/2006 | Schmidt | H04Q 11/04 370/493 |
| 2007/0242661 A1* | 10/2007 | Tran | H04L 29/1216 370/352 |
| 2008/0091793 A1 | 4/2008 | Diroo | |
| 2008/0159298 A1* | 7/2008 | Peterson | H04L 12/66 370/395.53 |
| 2013/0129063 A1* | 5/2013 | Grant | H04M 3/42 379/102.04 |
| 2014/0126705 A1* | 5/2014 | Levonas | H04M 11/062 379/1.03 |
| 2014/0233951 A1* | 8/2014 | Cook | H04L 63/02 398/67 |
| 2015/0078756 A1* | 3/2015 | Soto | H04B 10/808 398/116 |
| 2015/0244877 A1* | 8/2015 | Grant | H04M 3/42 379/413 |
| 2016/0329930 A1* | 11/2016 | Wang | H04B 10/25 |

FOREIGN PATENT DOCUMENTS

| | | |
|---|---|---|
| CN | 103051462 A | 4/2013 |
| EP | 2456189 A1 | 5/2012 |

OTHER PUBLICATIONS

European Search Report for corresponding application EP 14 79 1243; Report dated Dec. 21, 2016.

* cited by examiner

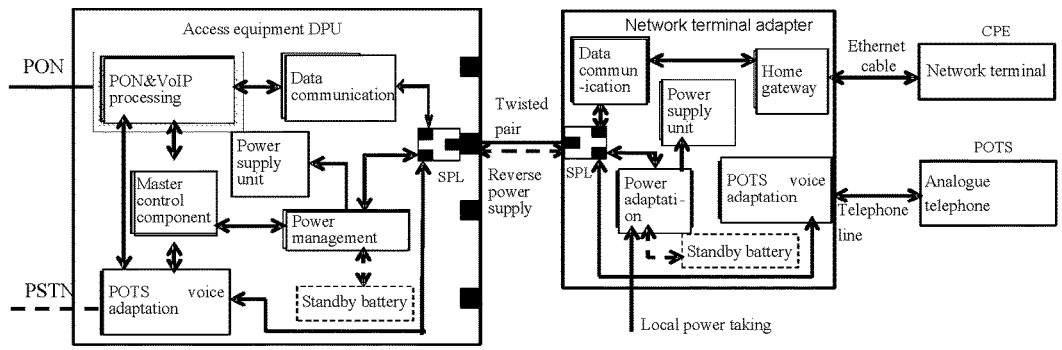

Fig. 16

Access equipment DPU                                    Network terminal adapter

| The DPU detects a called request service of a user voice, and sends a local code of the called request service → | S1702 |

| ← The network adapter performs conversion, sends a ringing signal to a POTS telephone and feeds back information to the DPU | S1704 |

| The network adapter and the DPU keep an initial or reverse power supply state all the time ← | S1706 |

| A voice adaptation component of the DPU enables a conversation mode, and monitors a hang on/off state of the telephone → | S1708 |

| The telephone of the user is hung on to start a conversation, and the DPU supplies power to a POTS line → | S1710 |

| The DPU monitors that the telephone is hung off, disables the conversation mode, and is recovered into an initial mode → | S1712 |

| ← The network adapter disables the conversation mode, is recovered into an initial state, and keeps reverse power supply | S1714 |

Fig. 17

METHOD, DEVICE AND SYSTEM FOR ISOLATING SERVICES, DPU AND NETWORK ADAPTER

TECHNICAL FIELD

The present disclosure relates to the field of communication, and in particular to a method, device and system for isolating services, a distributed point unit (DPU), and a network adapter.

BACKGROUND

Along with increasing advancement of a current Fiber to the Home (FTTH) technology, home and abroad telecommunication operating companies are gradually improving their capabilities in providing bandwidths for user homes, and have had capabilities of providing 1,000 M for each building and providing 100 M for each home. However, FTTH implementation cost is relatively high and an investment proportion of FTTH cost of last hundred of meters is highest, which causes lower rate of return on investment of FTTH and excessively long investment recovery cycle, and thus the operating companies adopt various segmented FTTH manners which are more economical and practical instead. In order to provide higher bandwidths and more efficient service for users, the operating companies arrange, according to practical conditions, optical nodes at positions closer to the users as much as possible, and extend fiber deployment to the last level of distributed points to implement Fiber to the Distribution point (FTTDp). A manner of twisted pair, Ethernet cable, coaxial line, power line or the like instead of fiber is adopted as an FTTH medium to implement direct FTTH. An access technology also includes a Very high bit-rate Digital Subscriber Line (VDSL), a Local Area Network (LAN), an Emergency Changeover Order (ECO) signal, a Power Line Communication (PLC) manner, Gfast and the like.

In an FTTDp scenario, a DPU is flexibly deployed, and is usually deployed at an outdoor information box, an outdoor line pole, an outdoor entrance door, an indoor house basement, an indoor connection hole and the like. Due to complexity of an access environment, it is difficult to supply power to the equipment. When laying a dedicated electric wire from a public power supply to the DPU, it may increase system deployment cost. Since the DPU is usually at a distance of smaller than 200 meters away from a user terminal, power may be reversely supplied to the DPU through user-end equipment.

However, when multiple user terminals connected to a DPU reversely supply power to the DPU, how to ensure fairness among users and transparency on supplying power is a prime problem. Mounting and deployment conditions of the DPU are relatively complex and flexible, it is necessary to utilize an existing access medium such as a twisted pair, an Ethernet cable and a coaxial cable when a user side reversely supplies power to the DPU, wherein reverse power supply with the twisted pair is one of typical scenes. In addition, there are a lot of Plain Old Telephone Services (POTSs) of a user in an existing network, wherein the POTSs are based on Public Switch Telephone Network (PSTN). It is required a long time to completely replace telephone equipment corresponding to these POTSs with Voice over Internet Protocol (VoIP) equipment, However, when analogue voice service communication between the DPU and the POTS telephone equipment is required, due to that the POTS telephone equipment is narrowband voice and analogue telephone equipment, transmission on the same twisted pair may cause the problem of coexistence of direct current voltages and low-frequency signals (such as a working voltage of the telephone equipment, 25 Hz telephone ringing and host dialing) with reverse power supply on the equipment. Therefore, user-end equipment is required to be compatible with existing POTS voice equipment to ensure that the POTS telephone equipment may still work normally in a reverse power supply process of the user-end equipment when reversely supplying power to a DPU through the twisted pair.

Therefore, there exists the problem that reverse power supply and normal operation of a POTS telephone may not coexist in a related art.

SUMMARY

The present disclosure provides a method, device and system for isolating services, a DPU, and a network adapter, so as to at least solve the problem that the reverse power supply and the normal operation of the POTS telephone may not coexist in the related art.

According to one aspect of the present disclosure, a method for isolating services is provided, comprising: determining a physical division manner, used for service isolation, of a twisted pair connected between a Distributed Point Unit (DPU) on an access network side and a network adapter on a user side, wherein the physical division manner comprises at least one of: a time division manner, a frequency division manner and a line space division manner; and performing, according to the determined physical division manner, isolation processing on a Plain Old Telephone Service (POTS) and a reverse power supply service executed on the DPU by user-side equipment, which are transmitted on the twisted pair.

In an example embodiment, determining the physical division manner, used for the service isolation, of the twisted pair connected between the DPU on the access network side and the network adapter on the user side comprises: when there is merely one twisted pair between the DPU and the network adapter, determining the physical division manner to be the time division manner and/or the frequency division manner.

In an example embodiment, when the physical division manner is determined to be the time division manner, performing, according to the determined physical division manner, isolation processing on the POTS and the reverse power supply service executed on the DPU by the user-side equipment, which are transmitted on the twisted pair comprises: judging whether there exists the POTS on the twisted pair or not; when a judgment result is that there exists the POTS on the twisted pair, stopping the reverse power supply service until the POTS is ended; and/or, when the judgment result is that there is no the POTS on the twisted pair, recovering the reverse power supply service executed on the DPU by the user-side equipment.

In an example embodiment, when the physical division manner is determined to be the frequency division manner, performing, according to the determined physical division manner, isolation processing on the POTS and the reverse power supply service executed on the DPU by the user-side equipment, which are transmitted on the twisted pair comprises: determining different working frequency bands for the POTS and the reverse power supply service executed on the DPU by the user-side equipment, which are transmitted on the twisted pair; and performing isolation processing on the POTS and the reverse power supply service in a manner of bearing the POTS and the reverse power supply service in the different working frequency bands.

In an example embodiment, determining the physical division manner, used for service isolation, of the twisted pair connected between the DPU on the access network side and the network adapter on the user side comprises: when there are at least two twisted pairs between the DPU and the network adapter, determining the physical division manner to be the line space division manner.

In an example embodiment, when the physical division manner is determined to be the line space division manner, performing isolation processing on the POTS and the reverse power supply service according to the determined physical division manner comprises: determining different twisted pairs for the POTS and the reverse power supply service; and performing isolation processing on the POTS and the reverse power supply service in a manner of bearing the POTS and the reverse power supply service on the different twisted pairs.

In an example embodiment, before determining the physical division manner, used for the service isolation, of the twisted pair connected between the DPU on the access network side and the network adapter on the user side, further comprising: monitoring the POTS and/or the reverse power supply service.

According to another aspect of the present disclosure, a device for isolating services is provided, comprising: a determining component, configured to determine a physical division manner, used for service isolation, of a twisted pair connected between a Distributed Point Unit (DPU) on an access network side and a network adapter on a user side, wherein the physical division manner comprises at least one of: a time division manner, a frequency division manner and a line space division manner; and a processing component, configured to perform, according to the determined physical division manner, isolation processing on a Plain Old Telephone Service (POTS) and a reverse power supply service executed on the DPU by user-side equipment, which are transmitted on the twisted pair.

In an example embodiment, the determining component comprises: a first determining element, configured to, when there is merely one twisted pair between the DPU and the network adapter, determine the physical division manner to be the time division manner and/or the frequency division manner.

In an example embodiment, the processing component comprises: a judging element, configured to, when the physical division manner is determined to be the time division manner, judge whether there exists the POTS on the twisted pair or not; a stopping element, configured to, when a judgment result of the judging element is that there exists the POTS on the twisted pair, stop the reverse power supply service is stopped until the POTS is ended; and/or, a recovering element, configured to, when the judgment result of the judging element is that there is no the POTS on the twisted pair, recover the reverse power supply service executed on the DPU by the user-side equipment.

In an example embodiment, the processing component comprises: a second determining element, configured to, when the physical division manner is determined to be the frequency division manner, determine different working frequency bands for the POTS and the reverse power supply service executed on the DPU by the user-side equipment, which are transmitted on the twisted pair; and a first processing element, configured to perform isolation processing on the POTS and the reverse power supply service in a manner of bearing the POTS and the reverse power supply service in the different working frequency bands.

In an example embodiment, the determining component comprises: a third determining element, configured to, when there are at least two twisted pairs between the DPU and the network adapter, determine the physical division manner to be the line space division manner.

In an example embodiment, the processing component comprises: a fourth determining element, configured to, when the physical division manner is determined to be the line space division manner, determine different twisted pairs for the POTS and the reverse power supply service; and a second processing element, configured to perform isolation processing on the POTS and the reverse power supply service in a manner of bearing the POTS and the reverse power supply service on the different twisted pairs.

In an example embodiment, the device further comprising: a monitoring component, configured to monitor the POTS and/or the reverse power supply service.

According to another aspect of the present disclosure, a Distributed Point Unit, DPU is provided, comprising: any one of the above devices for isolating services.

According to another aspect of the present disclosure, a network adapter is provided, comprising: any one of the above devices for isolating services.

According to another aspect of the present disclosure, a system for isolating services is provided, comprising: the above DPU, the above the network adapter and the twisted pair connected between the DPU and the network adapter.

According to the present disclosure, the method is adopted as follows: a physical division manner, used for service isolation, of a twisted pair connected between a DPU on the access network side and a network adapter on the user side is determined, wherein the physical division manner includes at least one of: the time division manner, the frequency division manner and the line space division manner, and isolation processing is performed, according to the determined physical division manner, on the POTS and the reverse power supply service executed on the DPU by the user-side equipment, which are transmitted on the twisted pair, so that the problem that the POTS and the reverse power supply service executed on the DPU by the user-side equipment, which are transmitted on the twisted pair, may not coexist in the related art is solved, and the effect of improving a user experience is further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings:

FIG. 16 is an architecture diagram of a system for implementing coexistence of a POTS voice service and a reverse power supply service on a twisted pair in a physical frequency division manner according to an embodiment of the present disclosure;

FIG. 17 is a terminating working flowchart of a system telephone in a method for implementing coexistence of a POTS voice service and reverse power supply on a twisted pair in a physical frequency division manner according to an embodiment of the present disclosure;

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 1:
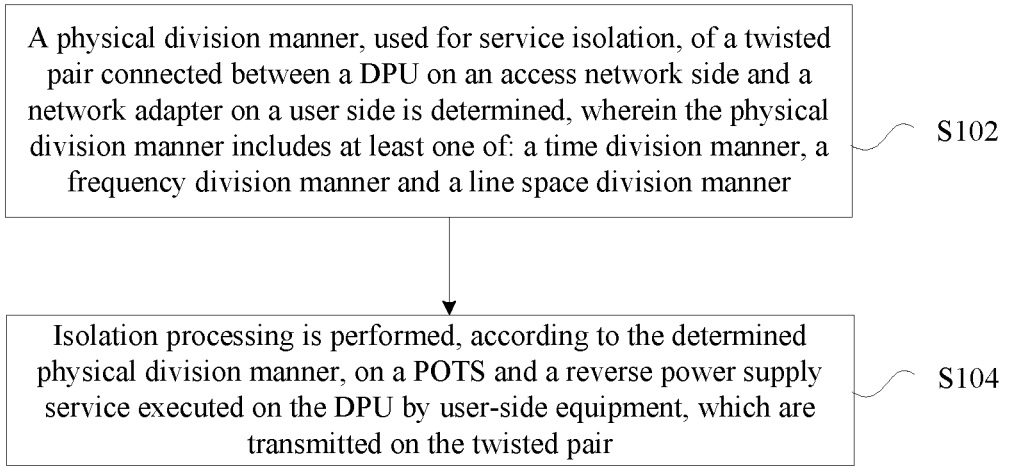
FIG. 1 is a flowchart of a method for isolating services according to an embodiment of the present disclosure.

The embodiment provides a method for isolating services, FIG. 1 is a flowchart of a method for isolating services according to an embodiment of the present disclosure, and as shown in FIG. 1, the flow includes the following steps:

Step 102: a physical division manner, used for service isolation, of a twisted pair connected between a DPU on an access network side and a network adapter on a user side is determined, wherein the physical division manner includes at least one of: a time division manner, a frequency division manner and a line space division manner; and Step 104: isolation processing is performed, according to the determined physical division manner, on a POTS and a reverse power supply service executed on the DPU by user-side equipment, which are transmitted on the twisted pair.

By the steps, the method is adopted as follows: the physical division manner, used for service isolation, of the twisted pair connected between the DPU on the access network side and the network adapter on the user side is determined, wherein the physical division manner includes at least one of: the time division manner, the frequency division manner and the line space division manner, and the isolation processing is performed according to the determined physical division manner, on the POTS and the reverse power supply service executed on the DPU by the user-side equipment, which are transmitted on the twisted pair. That is, the physical division manner is adopted to effectively isolate the two services which may not coexist in the related art, so that the problem that the POTS and the reverse power supply service executed on the DPU by the user-side equipment, which are transmitted on the twisted pair, may not coexist in the related art is solved, and the effect of improving a user experience is further achieved.

There may be merely one twisted pair or multiple twisted pairs between the DPU and the network adapter, the physical division manner is the time division manner and/or the frequency division manner when there is merely one twisted pair between the DPU and the network adapter, and it is necessary to adopt the time division manner or the frequency division manner when the POTS and the reverse power supply service may be executed on the one twisted pair, so that the problem about coexistence of the POTS and reverse power supply may be effectively solved.

When the time division manner is adopted to perform isolation processing on the POTS and the reverse power supply service executed on the DPU by the user-side equipment, processing priorities of the services may be set. For example, the processing priority of the POTS service may be set to be higher than the processing priority of the reverse power supply service by the following steps: whether there exists the POTS on the twisted pair or not is judged; when a judgment result is that there exists the PTOS on the twisted pair, the reverse power supply service is stopped until the POTS is ended; and/or, when the judgment result is that there is no the PTOS on the twisted pair, the reverse power supply service executed on the DPU by the user-side equipment is recovered. That is, when the time division manner is adopted, a voice service between the DPU and a POTS telephone is preferably executed in a system, and the reverse power supply service for the DPU is recovered when the POTS is ended, so that the POTS and the reverse power supply service may be effectively staggered to implement their coexistence on the same twisted pair.

When the frequency division manner is adopted to perform isolation processing on the POTS and the reverse power supply service executed on the DPU by the user-side equipment, the following manner may be adopted: different working frequency bands are determined for the POTS and the reverse power supply service executed on the DPU by the user-side equipment, which are transmitted on the twisted pair; and isolation processing is performed on the POTS and the reverse power supply service in a manner of bearing the POTS and the reverse power supply service in the different working frequency bands respectively. Therefore, the POTS and the reverse power supply service may be prevented from being executed in adjacent frequency bands, and may be staggered in working frequency to implement their coexistence on the same twisted pair.

When there are multiple twisted pairs between the DPU and the network adapter, the physical division manner may be the space division manner, and when the space division manner is adopted to perform isolation processing on the POTS and the reverse power supply service, the following steps are required: different twisted pairs are determined for the POTS and the reverse power supply service; and isolation processing is performed on the POTS and the reverse power supply service in a manner of bearing the POTS and the reverse power supply service on the different twisted pairs respectively. That is, when the space division manner is adopted, the POTS is executed on a dedicated twisted pair, and the reverse power supply service is executed on the DPU by the user-side equipment is executed on another twisted pair, so that the POTS and the reverse power supply service are staggered in space to implement their coexistence.

It is important to note that, in order to ensure determination of a better physical division manner or fairness of the reverse power supply service, the POTS and/or the reverse power supply service may further be monitored before the physical division manner, used for service isolation, of the twisted pair connected between the DPU on the access network side and the network adapter on the user side is determined. According to a monitoring result, the physical division manner is determined and whether to provide the reverse power supply service for the DPU or not is determined. Monitoring of the POTS and the reverse power supply service includes monitoring of a called signal of the POTS and monitoring of a calling signal of the POTS, and further includes monitoring of a service connection of a user. That is, the reverse power supply service is provided for the DPU merely when the user requires a broadband data service, so that a time division working flow and a frequency division working flow of the whole system may be effectively implemented by matching with a Central Processing Unit (CPU) of the equipment, and relative fairness and transparency of reverse power supply among users may further be ensured.

The embodiment further provides a device for isolating services, which is configured to implement the abovementioned embodiment and example implementation mode, and what has been described will not be elaborated. For example, term "component", used below, is a combination of software and/or hardware capable of realizing a preset function. The device described in the following embodiment is preferably implemented by software, but implementation of the device with hardware or the combination of software and hardware is also possible and conceivable.

Figure 2:
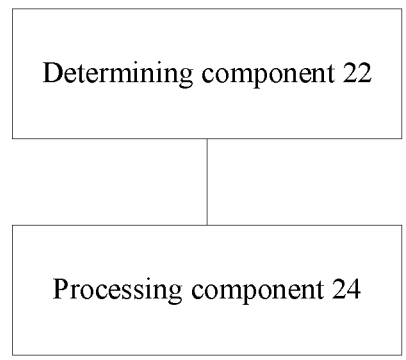
FIG. 2 is a structure block diagram of a device for isolating services according to an embodiment of the present disclosure.

FIG. 2 is a structure block diagram of a device for isolating services according to an embodiment of the present disclosure, and as shown in FIG. 2, the device includes a determining component 22 and a processing component 24. The service isolation processing device will be described below.

The determining component 22 is configured to determine a physical division manner, used for service isolation, of a twisted pair connected between a DPU on an access network side and a network adapter on a user side, wherein the physical division manner includes at least one of: a time division manner, a frequency division manner and a line space division manner; and the processing component 24 is connected to the determining component 22, and is configured to perform, according to the determined physical division manner, isolation processing on a POTS and a reverse power supply service executed on the DPU by user-side equipment, which are transmitted on the twisted pair.

Figure 3:
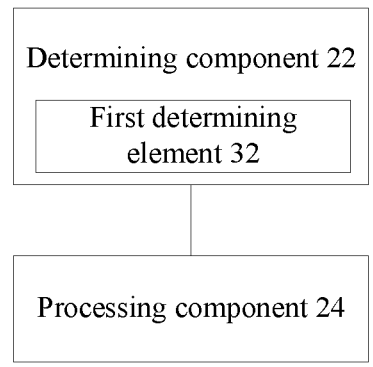
FIG. 3 is a first structure block diagram of the determining component 22 of the device for isolating services according to an embodiment of the present disclosure.

FIG. 3 is a first structure block diagram of the determining component 22 of the device for isolating services according to an embodiment of the present disclosure, and as shown in FIG. 3, the determining component 22 includes a first determining element 32. The determining component 22 will be described below.

The first determining element 32 is configured to, when there is merely one twisted pair between the DPU and the network adapter, determine the physical division manner to be the time division manner and/or the frequency division manner.

Figure 4:
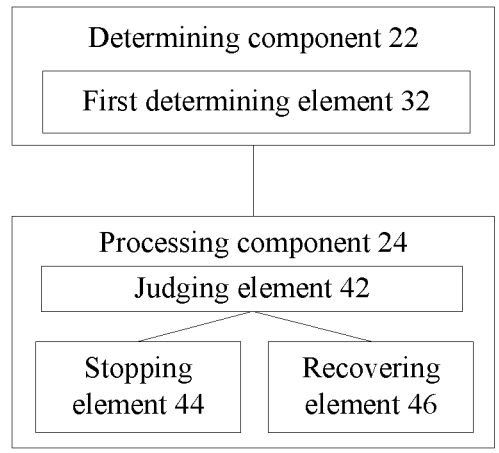
FIG. 4 is a first structure block diagram of the processing component 24 of the device for isolating services according to an embodiment of the present disclosure.

FIG. 4 is a first structure block diagram of the processing component 24 of the device for isolating services according to an embodiment of the present disclosure, and as shown in FIG. 4, the processing component 24 includes a judging element 42, a stopping element 44 and a recovering element 46. The processing component 24 will be described below.

The judging element 42 is configured to, when the physical division manner is determined to be the time division manner, judge whether there exists the POTS on the twisted pair or not; the stopping element 44 is connected to the judging element 42, and is configured to, when a judgment result of the judging element 42 is that there exists the POTS on the twisted pair, stop the reverse power supply service is stopped until the POTS is ended; and/or, the recovering element 46 is connected to the judging element 42, and is configured to, when the judgment result of the judging element 42 is that there is no the POTS on the twisted pair, recover the reverse power supply service executed on the DPU by the user-side equipment.

Figure 5:
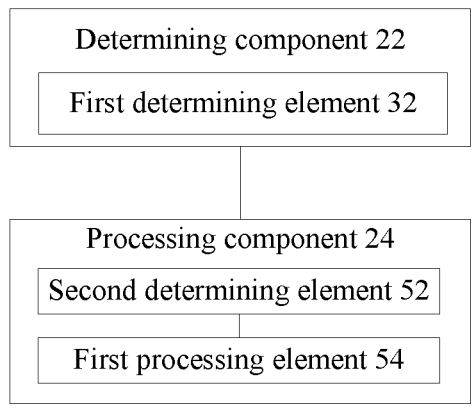
FIG. 5 is a second structure block diagram of the processing component 24 of the device for isolating services according to an embodiment of the present disclosure.

FIG. 5 is a second structure block diagram of the processing component 24 of the device for isolating services according to an embodiment of the present disclosure, and as shown in FIG. 5, the processing component 24 includes a second determining element 52 and a first processing element 54. The processing component 24 will be described below.

The second determining element 52 is configured to, when the physical division manner is determined to be the frequency division manner, determine different working frequency bands for the POTS and the reverse power supply service executed on the DPU by the user-side equipment, which are transmitted on the twisted pair; and the first processing element 54 is connected to the second determining element 52, and is configured to perform isolation processing on the POTS and the reverse power supply service in a manner of bearing the POTS and the reverse power supply service in the different working frequency bands respectively.

Figure 6:
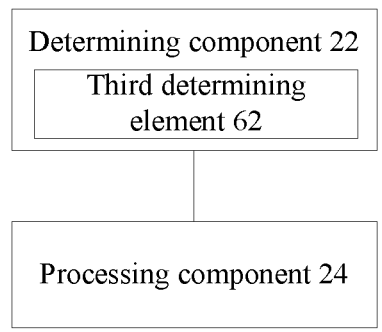
FIG. 6 is a second structure block diagram of the determining component 22 of the device for isolating services according to an embodiment of the present disclosure.

FIG. 6 is a second structure block diagram of the determining component 22 of the device for isolating services according to an embodiment of the present disclosure, and as shown in FIG. 6, the determining component 22 includes a third determining element 62. The determining component 22 will be described below.

The third determining element 62 is configured to, when there are at least two twisted pairs between the DPU and the network adapter, determine the physical division manner to be the space division manner.

Figure 7:
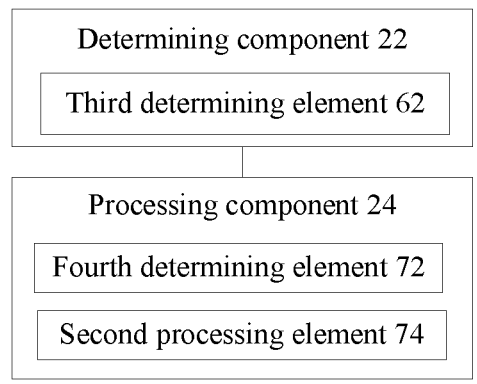
FIG. 7 is a third structure block diagram of the processing component 24 of the device for isolating services according to an embodiment of the present disclosure.

FIG. 7 is a third structure block diagram of the processing component 24 of the device for isolating services according to an embodiment of the present disclosure, and as shown in FIG. 7, the processing component 24 includes a fourth determining element 72 and a second processing element 74. The processing component 24 will be described below.

The fourth determining element 72 is configured to, when the physical division manner is determined to be the space division manner, determine different twisted pairs for the POTS and the reverse power supply service; and the second processing element 74 is connected to the fourth determining element 72, and is configured to perform isolation processing on the POTS and the reverse power supply service in a manner of bearing the POTS and the reverse power supply service on the different twisted pairs respectively.

Figure 8:
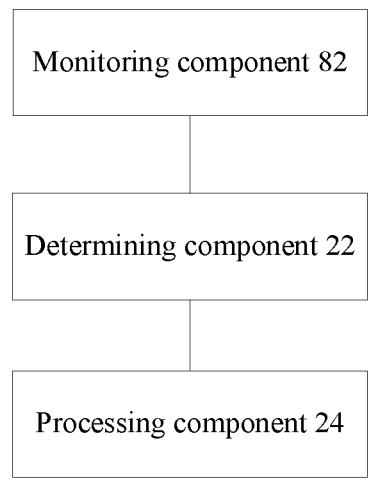
FIG. 8 is a preferred structure block diagram of a service isolation processing device according to an embodiment of the present disclosure.

FIG. 8 is an example structure block diagram of the device for isolating services according to an embodiment of the present disclosure, and as shown in FIG. 8, the device further includes a monitoring component 82, besides all the components shown in FIG. 2. The monitoring component 82 will be described below.

The monitoring component 82 is connected to the determining component 22, and is configured to monitor the POTS and/or the reverse power supply service.

Figure 9:
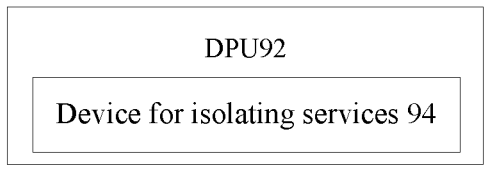
FIG. 9 is a structure block diagram of a DPU according to an embodiment of the present disclosure.

FIG. 9 is a structure block diagram of a DPU according to an embodiment of the present disclosure, and as shown in FIG. 9, the DPU 92 includes any abovementioned device for isolating services 94.

Figure 10:
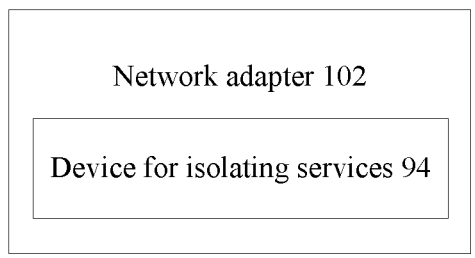
FIG. 10 is a structure block diagram of a network adapter according to an embodiment of the present disclosure.

FIG. 10 is a structure block diagram of a network adapter according to an embodiment of the present disclosure, and as shown in FIG. 10, the network adapter 102 includes any abovementioned device for isolating services 94.

Figure 11:
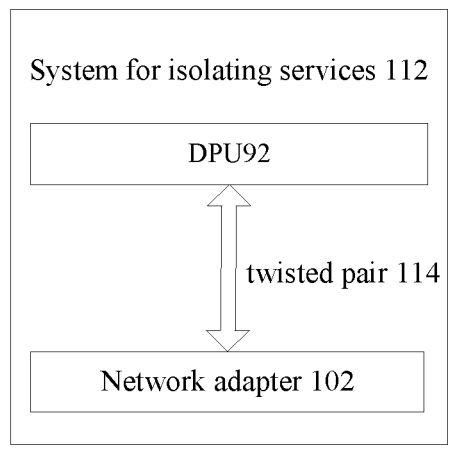
FIG. 11 is a structure block diagram of a system for isolating services according to an embodiment of the present disclosure.

FIG. 11 is a structure block diagram of a system for isolating services according to an embodiment of the present disclosure, and as shown in FIG. 11, the system for isolating services 112 includes the abovementioned DPU 92, the abovementioned network adapter 102 and the twisted pair 114 connected between the DPU and the network adapter.

By the abovementioned embodiment and example embodiment, the problem that reverse power supply and normal operation of a POTS telephone may not coexist in the related art is solved. The reverse power supply method, which coexists with an analogue telephone and may be configured in an FTTDp communication system, is implemented on the twisted pair. In the method, according to the principles of fairness, transparency and compatibility, reverse power supply is performed from user-end equipment to a DPU, and may coexist with the POTS analogue telephone.

In order to solve the technical problem, the embodiment of the present disclosure provides a reverse power supply method which may implement an analogue telephone on a twisted pair and may also be configured to an FTTDp communication system: user-end equipment implements coexistence and compatibility of the analogue telephone and reverse power supply on the twisted pair between the user-end equipment and a DPU in a physical division manner executed between the analogue telephone and reverse power supply on the twisted pair, for example, the physical division manner comprises a time division manner, a frequency division manner or a space division manner. The reverse power supply is also provided for the DPU in an Ethernet power supply manner or another power supply manner, and achieves power supply fairness and transparency in a manner of current sharing manner, a service-state-based power supply manner, a power supply volume statistics manner and the like.

The embodiment of the present disclosure adopts the following technical solution.

(1) A system for implementing coexistence of an analogue telephone and reverse power supply includes: a DPU (i.e. the abovementioned DPU) on an access network side, which is located at an optical node of the FTTDp. The DPU is connected with a Passive Optical Network (PON) in an uplink direction, may optionally be connected with a PSTN in the uplink direction according to a network requirement. The DPU is connected with a network adapter in a downlink direction through an access network and a twisted pair, and receives reverse power supply from the network adapter through the twisted pair. The DPU is mainly responsible for processing protocol conversion and data interaction between the PON and the access network (such as a VDSL, an Asymmetric Digital Subscriber Line (ADSL) and Gfast); and the network adapter on a user network side, which is located in a user home. The network adapter is connected with the DPU and the twisted pair in the uplink direction through the access network, and is connected with a network terminal in the downlink direction through an Ethernet cable or connected with a home telephone through a telephone line. The network adapter is mainly responsible for processing protocol conversion and data interaction between the access network and a home network and providing power for the DPU through the twisted pair.

(2) During reverse power supply on the twisted pair between the DPU and the network adapter, a POTS and a reverse power supply service are required to be isolated and traggered in a physical division manner between the DPU and the network adapter, wherein the physical division manner includes a time division manner, a frequency division manner and a line space division manner; and 48V-60V direct current power supply is provided between the DPU and the network adapter in a standard Power over Ethernet (POE) manner or another manner.

(3) When there is merely one twisted pair for reverse power supply between the DPU and the network adapter, the time division manner may be considered as the physical division manner to be adopted to isolate the POTS and reverse power supply between the DPU and the network adapter, so as to implement coexistence between the POTS and reverse power supply; and during operation of the POTS, the network adapter stops supplying power to the DPU, preferably implements the voice service between the DPU and a POTS telephone, and recovers reverse power supply to the DPU merely after the POTS is ended, thereby traggering on the time aspect, direct current voltages and low-frequency signals (such as a working voltage of the telephone, 25 Hz telephone ringing and host dialing) of the POTS and reverse direct current power supply of the user side equipment, so as to implement transmission and coexistence of the POTS and reverse power supply on the same twisted pair.

(4) When the time division manner is adopted, during operation of the POTS, the power supply of the DPU may be implemented by local power supply of an embedded standby battery when the DPU is in a single-user equipment state. The standby battery of the DPU may also support provision of remote power supply for the POTS telephone through the network adapter when it is necessary. Simultaneously, the standby battery provides a −48V direct current standby detection voltage for the telephone for the user. In a multi-user equipment state of the DPU, a power supply manner may be determined for power supply according to a condition of reverse power supply received from the user. Under the condition that some users may provide reverse power supply, these users provide reverse power supply in a current sharing manner, and if necessary, the DPU simultaneously provides remote power supply for a network adapter of the user using the POTS. Merely when no users may provide reverse power supply, power is locally supplied to the DPU by the embedded standby battery of the DPU, and if necessary, the standby battery of the DPU also supports provision of remote power supply for the POTS used by the user through the network adapter and simultaneously provides the −48V direct current standby detection voltage for the telephone for the user incapable of providing reverse power supply. The network adapter, When being required to provide reverse power supply in a time division mode, may flexibly take power to provide reverse power supply for the DPU in a local power taking manner or an optional battery power taking manner according to different scenes, and provide the −48V direct current standby detection voltage for the POTS telephone by the local power taking manner. The network adapter directly receives the −48V direct current standby detection voltage provided by the DPU for the POTS telephone when reverse power supply is not required and the POTS telephone is standby.

(5) When there is merely one twisted pair for reverse power supply between the DPU and the network adapter, the frequency division manner may also be adopted for physical division work of the POTS and reverse power supply between the DPU and the network adapter, so as to implement coexistence between the POTS and reverse power supply. During operation of the POTS, low-frequency information such as ringing and dialing of the POTS telephone between the DPU and the network adapter is converted into a 1-4 KHz local signal in a local coding and modulation manner, wherein the coding manner may be adopted Frequency Shift Keying (FSK) or another coding manner, and may also be modulated into a high-frequency alternating current signal. The reverse power supply and the low-frequency signal of the POTS do not work in adjacent frequency bands, so that a direct current signal of reverse power supply and the low-frequency signal such as ringing and dialing of the POTS are traggered in the working frequency. At the same time of the POTS, the user-end equipment reversely supplies power to the DPU to implement simultaneous transmission and coexistence on the same twisted pair. The network adapter may flexibly take power to provide reverse power supply for the DPU or provide power for the POTS telephone according to different scenes in a frequency division mode.

(6) When the frequency division mode is adopted, the network adapter and the DPU are required to convert the information such as ringing and dialing through local communication, the network adapter receives the ringing information sent by the DPU, initiates a 25 Hz ringing signal to the POTS telephone and simultaneously converts the dialing information of the POTS telephone into coded local information for sending to the DPU, and the DPU performs corresponding processing according to the dialing information of the network adapter.

(7) When the time division and frequency division manners are adopted, a monitoring function is embedded into voice adaptation components of the DPU and the user-end network adapter respectively, and their voice adaptation components are used for detecting a called signal, of a POTS telephone, from a background system and a calling dialing signal from the POTS telephone, and are matched with the CPU of the equipment to implement the time division and frequency division working flows of the whole system.

(8) When there are multiple twisted pairs for reverse power supply between the DPU and the user network adapter, the space division manner may be adopted for physical division work of the POTS and reverse power supply between the DPU and the user network adapter, so as to implement coexistence between the POTS and reverse power supply; and the POTS is executed through a dedicated twisted pair for communication with the DPU, a data service is executed through another twisted pair, and reverse power supply of the user-end equipment to the DPU is executed through the twisted pair for the data service. In such a manner, coexistence between the POTS and reverse power supply may be implemented.

(9) When the frequency division or space division manner is adopted, the DPU may select a standby battery manner to provide standby power for the DPU according to a requirement, so as to ensure that the DPU may be in a working state all the time even when the user network adapter may not provide reverse power supply, thereby ensuring that the POTS is smooth and effective all the time.

(10) In order to ensure relative fairness and transparency of reverse power supply among the users, service monitoring is required in the DPU, and reverse power supply is provided for the DPU merely when the user requires a broadband data service; and in a multi-user port DPU state, it is also necessary to perform current sharing power supply processing on reverse power supply of each user, and a power metering device is added to a power adaptation component of the user network adapter to make statistics on a reverse power supply volume provided by the user for the DPU and power acquired from the DPU.

Example implementation modes of the present disclosure will be described below with reference to the drawings.

Figure 12:
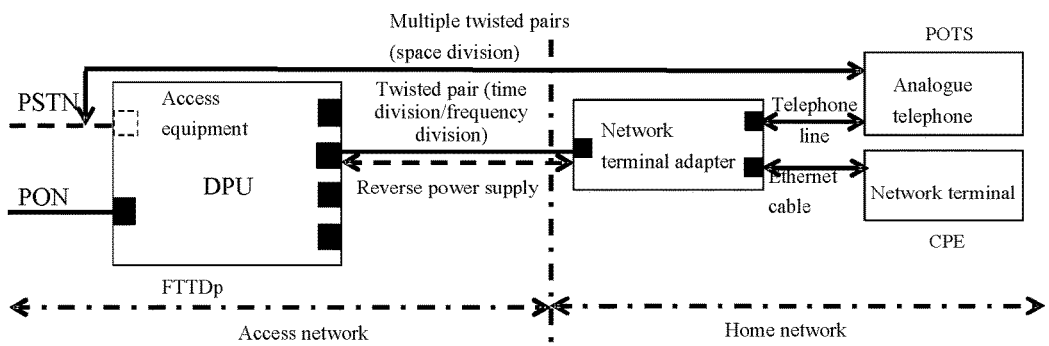
FIG. 12 is an architecture diagram of a system for implementing coexistence of a POTS analogue telephone and reverse power supply on a twisted pair in a physical division manner according to an embodiment of the present disclosure.

FIG. 12 is an architecture diagram of a system for implementing coexistence of a POTS analogue telephone and reverse power supply on a twisted pair in a physical division manner according to an embodiment of the present disclosure, and as shown in FIG. 12, a main equipment of the system includes a DPU on an access network side and a network adapter on a user network side, wherein the DPU is located at an optical node of the FTTDp, and is responsible for processing protocol conversion and data interaction between a PON and an access network (such as a VDSL, an ADSL and Gfast); and the network adapter is located in a user home, and is responsible for processing protocol conversion and data interaction between the access network and a home network and providing power for the DPU through a twisted pair.

Wherein, the DPU includes parts such as a PON&VoIP processing component, a data communication component, a master control component, a power management component, a voice adaptation component, a power supply unit and a Splitter (SPL), and optionally includes a standby battery according to a division mode and an application scene. The DPU is connected with the PON in an uplink direction, a VoIP service is transmitted to the DPU and even a user end through the PON, and the DPU is optionally connected with a PSTN in the uplink direction according to a network requirement; and the DPU is connected with the network adapter and a twisted pair in a downlink direction through the access network, and receives reverse power supply from the network adapter through the twisted pair.

The network adapter on the user network side includes parts such as a power adaptation component, a telephone adaptation component, a home gateway component, a power supply unit and a data communication component, and optionally includes a standby battery according to the division mode and the application scene, and the network adapter is connected with the DPU on the access network side in the uplink direction through the twisted pair, and is connected with a network terminal in the downlink direction through an Ethernet cable or connected with a home telephone through a telephone line; and the network adapter may divide the power adaptation component, the telephone adaptation component and the home gateway component into a single equipment state or flexibly combine them into a new equipment state according to a requirement.

During reverse power supply is performed on the twisted pair between the DPU and the network adapter, the DPU and the network adapter isolate and divide a POTS and a reverse power supply service in a physical division manner, wherein the physical division manner includes a time division manner, a frequency division manner and a line space division manner. Therefore, coexistence and compatibility of the POTS and the reverse power supply service are implemented; and 48V-60V direct current power supply is provided between the DPU and the network adapter in a standard POE manner or another manner.

In order to ensure relative fairness and transparency of reverse power supply among users, service monitoring is required in the DPU, and reverse power supply is provided for the DPU merely when the user requires a broadband data service; and in a multi-user port DPU state, it is also necessary to perform current sharing power supply processing on reverse power supply of each user, and a power metering device is added to the power adaptation component of the user network adapter to make statistics on a reverse power supply volume provided by the user side for the DPU and power acquired from the DPU.

The system may push a VoIP service to the DPU through the PON and then convert the VoIP service into a conventional POTS through the PON&VoIP processing component, and may also directly connect a conventional PSTN-based POTS into the DPU to implement the conventional POTS through the voice adaptation components of the DPU and the user network adapter.

A monitoring function is embedded into the voice adaptation components of the DPU and the user-end network adapter respectively, and their voice adaptation components are configured to detect a POTS telephone calling signal from a background system and a calling dialing signal from the POTS telephone, and are configured to match with a CPU of the equipment to implement time division and frequency division working flows of the whole system.

When the frequency division or space division manner is adopted, the DPU may select a standby battery manner to provide standby power for the DPU according to a requirement, so as to ensure that the DPU may be in a working state all the time even when the user network adapter may not provide reverse power supply, thereby ensuring that the POTS is smooth and effective all the time.

Some typical implementation cases of implementing a coexistence of a POTS telephone and reverse power supply on a twisted pair in a physical division manner will be listed below with reference to the drawings.

Example 1 (A Physical Time Division Manner is Adopted)

Figure 13:
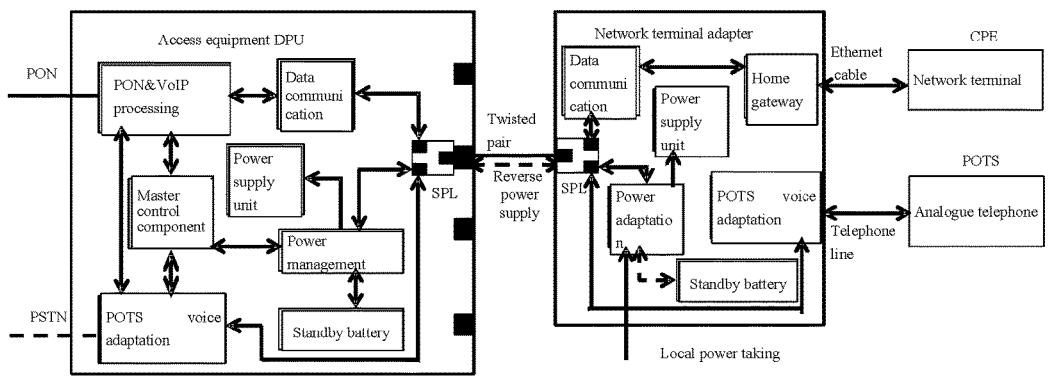
FIG. 13 is an architecture diagram of a system for implementing coexistence of a POTS voice service and a reverse power supply service on a twisted pair in a physical time division manner according to an embodiment of the present disclosure.

FIG. 13 is an architecture diagram of a system for implementing coexistence of a POTS voice service and a reverse power supply service on a twisted pair in a physical time division manner according to an embodiment of the present disclosure. As shown in FIG. 13, a time division manner is adopted for physical division work of the POTS and reverse power supply between a DPU and a network adapter, so as to implement coexistence between the POTS and reverse power supply. During operation of the POTS of the system, the network adapter stops supplying power to the DPU, preferably implements the voice service between the DPU and a POTS telephone, and recovers reverse power supply to the DPU merely after the POTS is ended, thereby temporally traggering a low-frequency signal (such as POTS ringing and dialing) and reverse direct current power supply of the user side equipment to implement transmission and coexistence on the same twisted pair.

When the time division manner is adopted, during operation of the POTS, power supply may be implemented by local power supply of an embedded standby battery in a single-user equipment state of the DPU, and if necessary, the standby battery of the DPU may also support provision of remote power supply for a POTS telephone through the network adapter and simultaneously provide a −48V direct current standby detection voltage for the telephone of a user.

When the DPU is in a multi-user equipment state, a power supply manner of the power supply may be determined according to a condition of reverse power supply received from the user. Under the condition that some users may provide reverse power supply, these users provide reverse power supply in a current sharing manner, and if necessary, the DPU simultaneously provides remote power supply for the network adapter of the user using the POTS. Merely when no users may provide reverse power supply, power is locally supplied to the DPU by an embedded standby battery of the DPU, and if necessary, the standby battery of the DPU also supports provision of remote power supply for the user using the POTS through the network adapter and simultaneously provides the −48V direct current standby detection voltage for the telephone for the user incapable of providing reverse power supply.

When being required to provide reverse power supply in a time division mode, the network adapter may flexibly take power to provide reverse power supply for the DPU in a local 220 VAC alternating current power taking manner or an optional standby battery power taking manner according to different scenes, and the network adapter may provide a −48V direct current standby detection voltage for the POTS telephone by a local power taking manner. The network adapter of the user directly receives the −48V direct current standby detection voltage provided by the DPU for the POTS telephone when there is no POTS operated and the reverse power supply is stopped. The network adapter provides remote power supply for the POTS telephone from the DPU when there is a POTS operated and the reverse power supply is stopped.

48V-60V direct current power supply is provided between the DPU and the network adapter in a standard POE manner or another manner.

Figure 14:
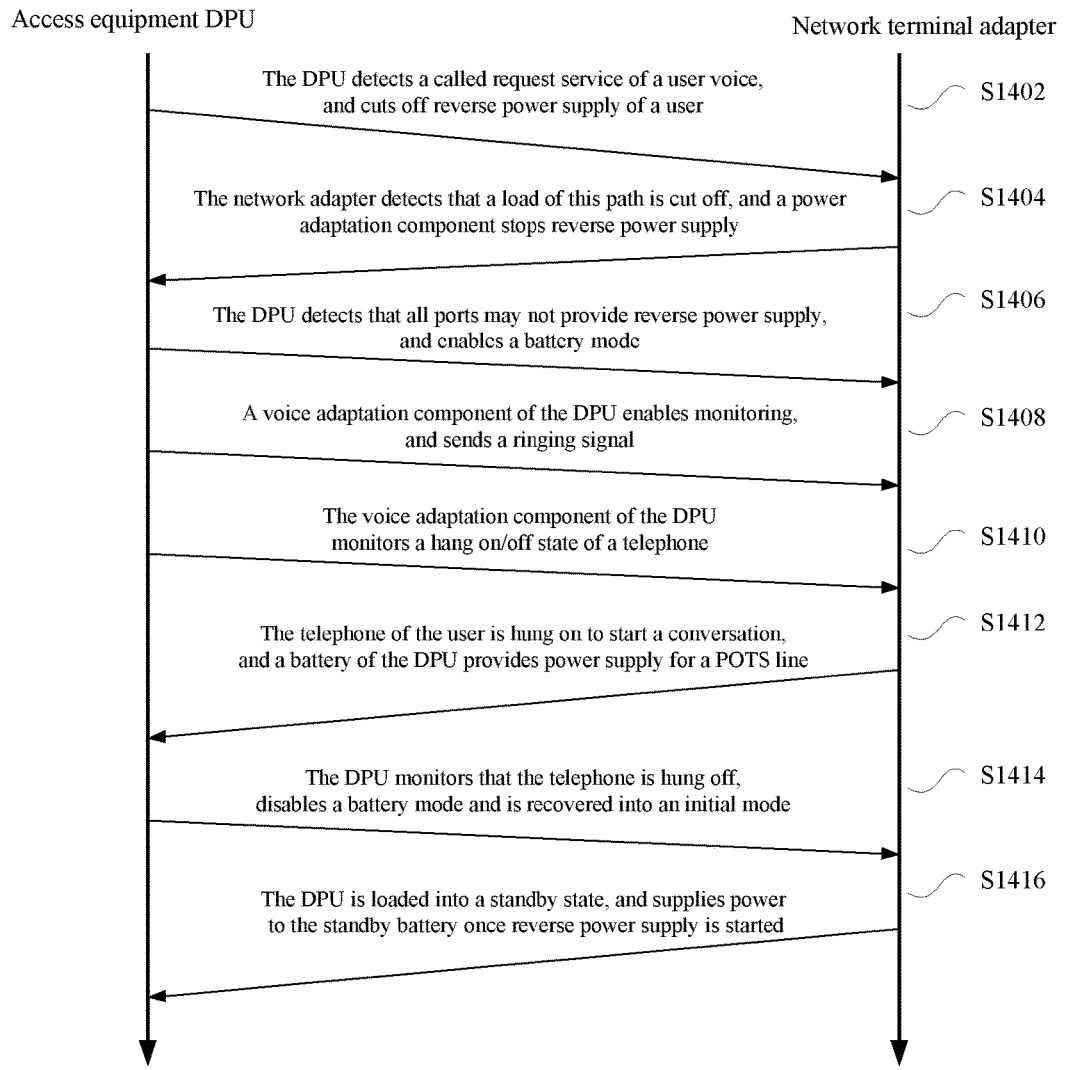
FIG. 14 is a terminating working flowchart of a system telephone in a method for implementing coexistence of a POTS voice service and reverse power supply on a twisted pair in a physical time division manner according to an embodiment of the present disclosure.

FIG. 14 is a called working flowchart of a system telephone in a method for implementing coexistence of a POTS voice service and reverse power supply on a twisted pair in a physical time division manner according to an embodiment of the present disclosure, and as shown in FIG. 14, the working flowchart includes the following steps:

Step 1402: An access-end DPU detects a called request service of a user voice from a VoIP service or a PSTN, and a power component cuts off reverse power supply of a user of a path corresponding to the called request service;

Step 1404: A power management component of a user-end network adapter detects that a load of the path is cut off, and then stop reverse power supply of the path executed in a POE manner and the like;

Step 1406: When equipment is multi-port equipment, the DPU detects whether all ports may not perform reverse power supply or not, and when some users may provide reverse power supply, the DPU is switched into reverse power supply from these users, and these users provides system power supply; when it is detected that all the ports may not provide reverse power supply, own standby battery mode is enabled;

Step 1408: A POTS voice adaptation component of the DPU enters a monitoring state, and sends a ringing signal to a telephone of the user of this path, and the telephone of the user starts ringing;

Step 1410: The voice adaptation component of the DPU is matched with a voice adaptation component of the user-end network adapter to monitor a hang on/off state of the telephone;

Step 1412: The telephone of the user is hung on to start a conversation, and a battery of the DPU supplies power to a POTS voice line to ensure smoothness of the POTS;

Step 1414: The conversation is ended, the telephone of the user is hung off, the voice adaptation component of the DPU monitors that the telephone is hung off, and the DPU disables the standby battery mode, and is recovered into an initial state mode; and Step 1416: The DPU is powered to enter a standby state, and when there is a user starting providing reverse power supply, the DPU charges the standby battery to finish a duty cycle when being powered.

Figure 15:
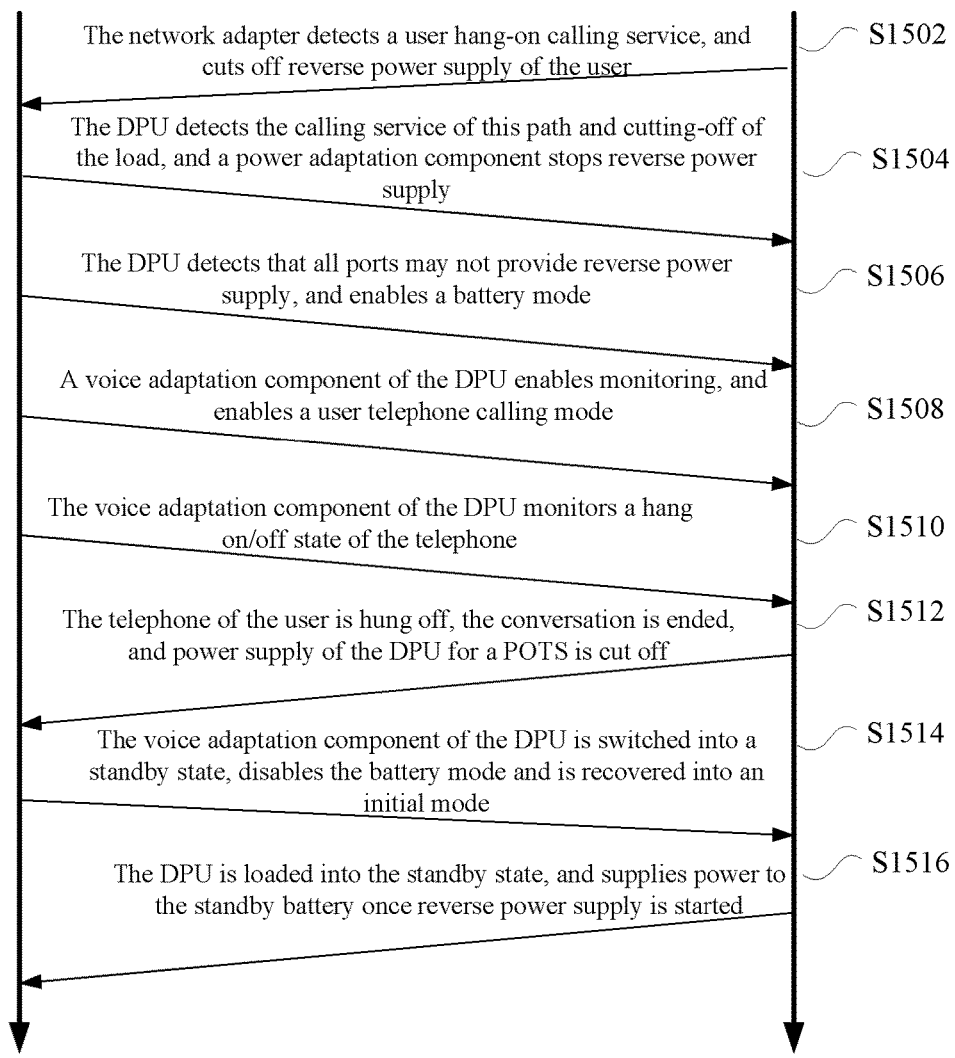
FIG. 15 is a calling working flowchart of a system telephone in a method for implementing coexistence of a POTS voice service and reverse power supply on a twisted pair in a physical time division manner according to an embodiment of the present disclosure.

FIG. 15 is a calling working flowchart of a system telephone in a method for implementing coexistence of a POTS voice service and reverse power supply on a twisted pair in a physical time division manner according to an embodiment of the present disclosure, and as shown in FIG. 15, the working flowchart includes the following steps:

Step 1502: A user-end network adapter detects that a POTS telephone of a user is hung on and prepares a calling service, and then a power management component cuts off reverse power supply of the user of a path corresponding to the calling service;

Step 1504: An access-end DPU detects the calling service of the telephone of the user and sends a calling request in an uplink direction, and a power management component detects that a reverse power supply load of this path is cut off, and then stops reverse power supply of this path executed in a POE manner and the like;

Step 1506: When equipment is multi-port equipment, the DPU detects whether all ports may not perform reverse power supply or not, and when some users may provide reverse power supply, the DPU is switched into reverse power supply of these users, and these users provides system power supply; when it is detected that all the ports may not provide reverse power supply, a standby battery mode of the DPU is enabled;

Step 1508: A POTS voice adaptation component of the DPU enters a monitoring state, enables a user telephone calling mode and receives calling dialing information of the user to start a conversation, and a battery of the DPU provides power supply for a POTS voice line to ensure smoothness of the voice service;

Step 1510: The voice adaptation component of the DPU is matched with a voice adaptation component of the user-end network adapter to monitor a hang on/off state of the telephone;

Step 1512: The telephone of the user is hung off, the conversation is ended, the voice adaptation component of the DPU monitors that the telephone is hung off, and power supply provided by the battery of the DPU for the POTS is cut off;

Step 1514: The DPU switches a function state of the voice adaptation component into a standby working state, disables the battery mode and is recovered to an initial state mode; and Step 1516: The DPU is powered to enter a standby state, and when there is a user starting providing reverse power supply, the DPU charges the standby battery to finish a duty cycle when being powered.

Example 2 (A Physical Frequency Division Manner is Adopted)

FIG. 16 is an architecture diagram of a system for implementing coexistence of a POTS voice service and a reverse power supply service on a twisted pair in a physical frequency division manner according to an embodiment of the present disclosure. As shown in FIG. 16, a frequency division manner is adopted for physical division work of a POTS and reverse power supply between a DPU and a network adapter, and the network adapter and the DPU are required to convert information such as ringing and dialing through local communication, so as to implement coexistence between the POTS and reverse power supply. During operation of the POTS, low-frequency signal such as ringing and dialing of a POTS telephone between the DPU and the network adapter is converted into a 1-4 KHz local signal through voice adapters of the DPU and the network adapter in a local coding and modulation manner, wherein the coding and modulation manner may be FSK or another coding and modulation manner. The low-frequency signal may also be modulated into a high-frequency alternating current signal, and a direct current signal of reverse power supply and the low-frequency signal of ringing, dialing and the like of the POTS telephone are traggered in working frequency, thereby implementing simultaneous transmission of the POTS and reverse power supply on the same twisted pair.

The network adapter plays a role of relaying and converting the POTS, and the voice adapter of the network adapter provides conversion between a −48 direct current standby detection voltage and working voltage of the POTS for the POTS telephone according to a condition of the voice service. When there is a telephone called service from the DPU, a coded telephone called local signal from the DPU is converted into a corresponding 25 Hz called ringing signal and provides the 25 Hz called ringing signal for the POTS telephone to trigger the POTS telephone to ring; and when there is a calling dialing service of a POTS telephone, POTS calling dialing information is coded and converted into a calling local signal to send to the DPU, and the DPU performs corresponding processing according to dialing information of the network adapter, and sends the calling service in an uplink direction.

The DPU may select a standby battery manner to provide standby power for the DPU according to a requirement, so as to ensure that the DPU may be in a working state all the time even when the user network adapter may not provide reverse power supply, thereby ensuring that the POTS is smooth and effective all the time. In addition, an optional standby battery manner may also be adopted in the user-end network adapter, so as to charge the standby battery of the DPU and provide standby power for the home network adapter.

The system may push a VoIP service to the DPU through a PON and then convert the VoIP service into a conventional POTS through a PON&VoIP processing component. The system may also directly connect a conventional PSTN-based POTS into the DPU, so as to implement the conventional POTS through the voice adaptation components of the DPU and the user network adapter.

48V-60V direct current power supply is provided between the DPU and the network adapter in a standard POE manner or another manner.

A power taking manner of the user-end network adapter may be a manner of taking power from a local 220 VAC alternating current, may also adopt a manner of taking power from an optional standby battery of the user-end network adapter, and may further adopt a manner of taking power from remote power supply of the DPU.

FIG. 17 is a called working flowchart of a system telephone in a method for implementing coexistence of a POTS voice service and reverse power supply on a twisted pair in a physical frequency division manner according to an embodiment of the present disclosure, and as shown in FIG. 17, the working flowchart includes the following steps:

Step 1702: An access-end DPU detects a called request service of a user voice from a VoIP service or a PSTN, converts the called request service into a corresponding local code through a voice adaptation component, and sends the local code of the called request service to a user-end network adapter;

Step 1704: The user-end network adapter sends a low-frequency ringing signal to a POTS telephone after receiving the code of the called request service of the DPU, and feeds back ringing information to the DPU, and the POTS telephone of a user starts ringing;

Step 1706: The user-end network adapter and the DPU keep a reverse power supply state or an initial power supply standby state;

Step 1708: The POTS voice adaptation component of the DPU enters a conversation mode, and is matched with a voice adaptation component of the user-end network adapter to monitor a hang on/off state of the telephone;

Step 1710: The telephone of the user is hung on to start a conversation, and the DPU provides power supply for a POTS voice line to ensure smoothness of the voice service;

Step 1712: The conversation is ended, the telephone of the user is hung off, and the voice adaptation component of the DPU monitors that the telephone is hung off, exits the conversation mode, and is recovered into an initial state mode; and Step 1714: The user-end network adapter disables the conversation mode, and is recovered into an initial working state, and when there is a user providing reverse power supply, reverse power supply is kept to finish a duty cycle.

Figure 18:
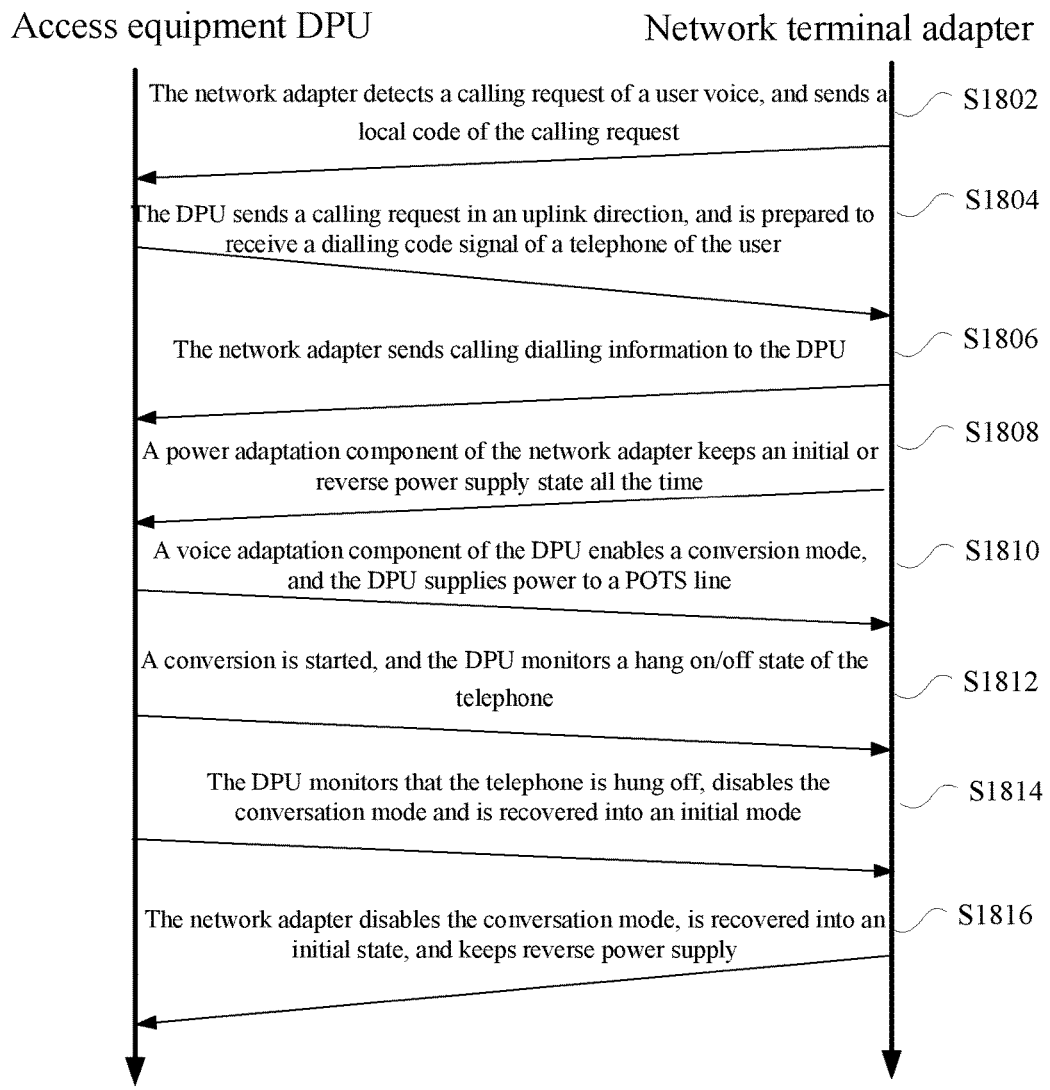
FIG. 18 is a calling working flowchart of a system telephone in a method for implementing coexistence of a POTS voice service and reverse power supply on a twisted pair in a physical frequency division manner according to an embodiment of the present disclosure.

FIG. 18 is a calling working flowchart of a system telephone in a method for implementing coexistence of a POTS voice service and reverse power supply on a twisted pair in a physical frequency division manner according to an embodiment of the present disclosure, and as shown in FIG. 18, the working flowchart includes the following steps:

Step 1802: A user-end network adapter detects that a POTS telephone of a user is hung on and prepares a calling service, then locally codes a calling service request through a voice adaptation component, and sends a calling request to a DPU;

Step 1804: The access-end DPU detects the calling service of the telephone of the user, sends a calling request in an uplink direction, and is prepared to receive a local code signal of a calling dialing of the telephone of the user;

Step 1806: The user-end network adapter locally codes the calling dialing information, and sends the coded calling dialing information to the DPU, and keeps an initial reverse power supply or standby working state;

Step 1808: A POTS voice adaptation component of the DPU enters a monitoring state, enables a user telephone calling mode, and receives the calling dialing information of the user to start a conversation, the DPU provides power supply for a POTS voice line to ensure smoothness of the voice service;

Step 1810: The voice adaptation component of the DPU and the voice adaptation component of the user-end network adapter are matched to monitor a hang on/off state of the telephone;

Step 1812: The telephone of the user is hung off, the conversation is ended, and the voice adaptation component of the DPU monitors that the telephone is hung off, cuts off power supply provided by the battery of the DPU for the POTS, disables the conversation mode and is recovered into an initial state mode; and Step 1814: The user-end network adapter disables the conversation mode, and is recovered into an initial working state, and when there is a user providing reverse power supply, reverse power supply is kept to finish a duty cycle.

Example 3 (A Physical Space Division Manner is Adopted)

Figure 19:
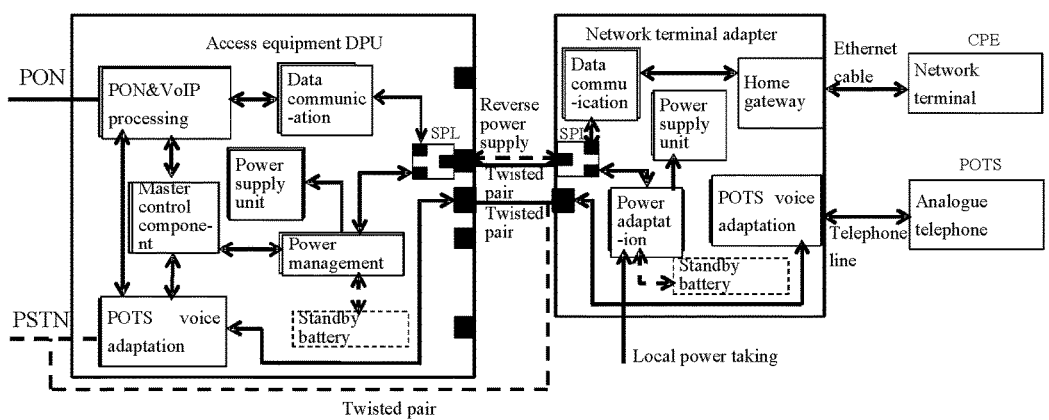
FIG. 19 is an architecture diagram of a system for implementing coexistence of a POTS voice service and a reverse power supply service on a twisted pair in a physical space division manner according to an embodiment of the present disclosure.

FIG. 19 is an architecture diagram of a system for implementing coexistence of a POTS voice service and a reverse power supply service on a twisted pair in a physical space division manner according to an embodiment of the present disclosure. As shown in FIG. 19, when there are multiple twisted pairs for reverse power supply between a DPU and a user network adapter, a space division manner may be adopted for physical division work of a POTS and reverse power supply between the DPU and the user network adapter, so as to implement coexistence between the POTS and reverse power supply; and the POTS is executed through a dedicated twisted pair (POTS voice twisted pair) for communication with the DPU, a data service is executed through another twisted pair, and reverse power supply of user-end equipment to the DPU is executed through the twisted pair for the data service. In such a manner, coexistence between the POTS and reverse power supply may be implemented.

When reverse power supply method based on a space division mode is adopted, the POTS may also be connected with a PSTN directly through the voice twisted pair instead of the PDU, and the DPU and the user network adapter merely perform IP data service interaction.

A standard PSTN service flow is adopted for execution of the POTS through the dedicated voice twisted pair between the DPU and the user network adapter, and the DPU or upper-layer equipment of the PSTN provides a −48 standby detection voltage, a ringing signal, calling dialing detection and the like for a POTS telephone.

The DPU may select a standby battery manner to provide standby power for the DPU according to a requirement, so as to ensure that the DPU may be in a working state all the time even when the user network adapter may not provide reverse power supply, thereby ensuring that the POTS is smooth and effective all the time. In addition, an optional standby battery manner may also be adopted in the user-end network adapter, so as to charge the standby battery of the DPU and provide standby power for the home network adapter.

The system may push a VoIP service to the DPU through a PON and then convert the VoIP service into a conventional POTS through a PON&VoIP processing component. The system may also directly connect a conventional POTS into the DPU to implement the conventional POTS through voice adaptation components of the DPU and the user network adapter.

A power taking manner of the user network adapter may be a manner of taking power from a local 220 VAC alternating current, may also adopt a manner of taking power from an optional standby battery of the user network adapter, and may further adopt a manner of taking power from remote power supply of the DPU.

Figure 20:
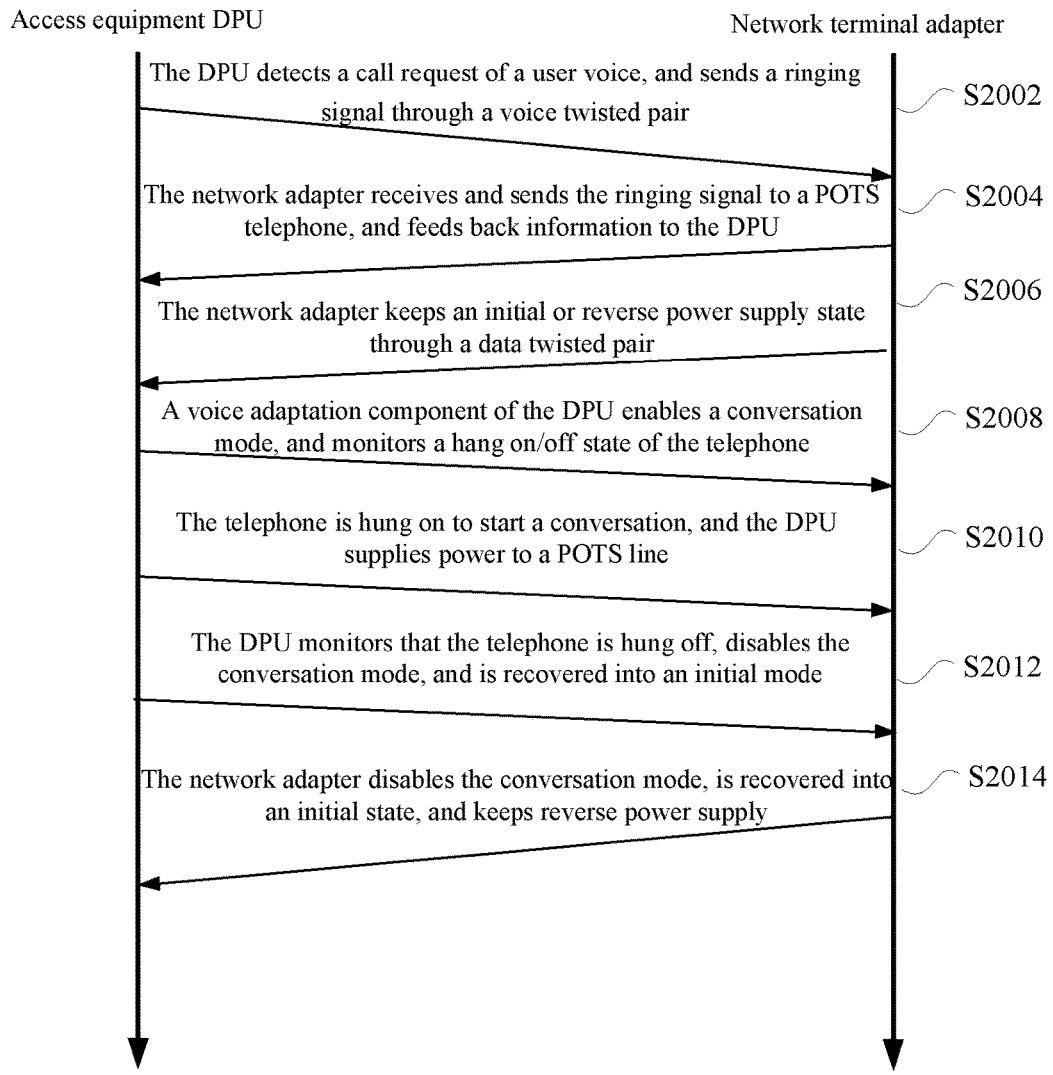
FIG. 20 is a terminating working flowchart of a system telephone in a method for implementing coexistence of a POTS voice service and reverse power supply on a twisted pair in a physical space division manner according to an embodiment of the present disclosure.

FIG. 20 is a called working flowchart of a system telephone in a method for implementing coexistence of a POTS voice service and reverse power supply on a twisted pair in a physical space division manner according to an embodiment of the present disclosure, and as shown in FIG. 20, the working flowchart includes the following steps:

Step 2002: An access-end DPU detects a called request service, of a user voice, from a VoIP service or a PSTN, transmits the called request service through a voice dedicated twisted pair through a voice adaptation component, and sends a ringing signal to a POTS telephone directly or through a user-end network adapter;

Step 2004: The user-end network adapter sends a low-frequency ringing signal to the POTS telephone after receiving the called request and the ringing signal of the DPU, and feeds back ringing information to the DPU, and the POTS telephone of a user starts ringing;

Step 2006: The user-end network adapter and the DPU keep a reverse power supply state or an initial power supply standby state through a data twisted pair;

Step 2008: A POTS voice adaptation component of the DPU enables a conversation mode, and is matched with a voice adaptation component of the user-end network adapter to monitor a hang on/off state of the telephone;

Step 2010: The telephone of the user is hung on to start a conversation, and the DPU provides power supply for a POTS voice line to ensure smoothness of the voice service;

Step 2012: The conversation is ended, the telephone of the user is hung off, and the voice adaptation component of the DPU monitors that the telephone is hung off, disables the conversation mode, and is recovered into an initial state mode; and Step 2014: The user-end network adapter disables the conversation mode, and is recovered into an initial working state, and when there is a user providing reverse power supply, reverse power supply is kept to finish a duty cycle.

Figure 21:
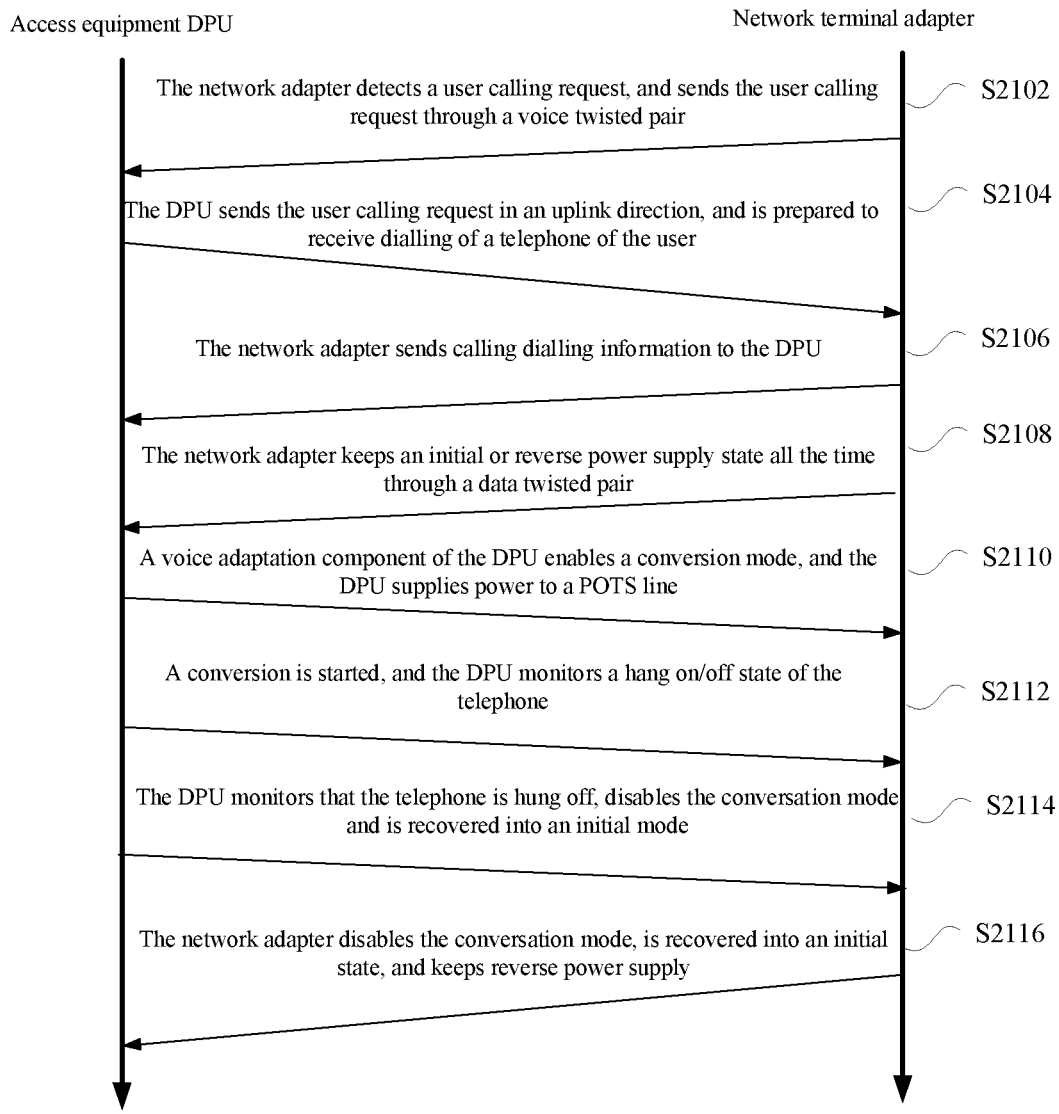
FIG. 21 is a calling working flowchart of a system telephone in a method for implementing coexistence of a POTS voice service and reverse power supply on a twisted pair in a physical space division manner according to an embodiment of the present disclosure.

FIG. 21 is a calling working flowchart of a system telephone in method for implementing coexistence of a POTS voice service and reverse power supply on a twisted pair in a physical space division manner according to an embodiment of the present disclosure, and as shown in FIG. 21, the working flowchart includes the following steps:

Step 2102: A voice adaptation component of a user-end network adapter detects that a POTS telephone of a user is hung on and prepares a calling service, then sends a calling service request through a voice dedicated twisted pair, and sends the calling request to a DPU;

Step 2104: The access-end DPU detects the calling service of the telephone of the user, sends a calling request in an uplink direction, and is prepared to receive calling dialing information of the telephone of the user;

Step 2106: The user-end network adapter sends the calling dialing information to the DPU, and keeps an initial reverse power supply or standby working state through a data twisted pair;

Step 2108: A POTS voice adaptation component of the DPU enters a monitoring state, enables a user telephone calling mode, and receives the calling dialing information of the user to start a conversation. The DPU provides power supply for a POTS voice line to ensure smoothness of the voice service;

Step 2110: The voice adaptation component of the DPU and a voice adaptation component of the user-end network adapter are matched to monitor a hang on/off state of the telephone;

Step 2112: The telephone of the user is hung off, the conversation is ended, and the voice adaptation component of the DPU monitors that the telephone is hung off, cuts off power supply provided by the battery of the DPU for the POTS, disables the conversation mode and is recovered into an initial state mode; and Step 2114: The user-end network adapter disables the conversation mode, and is recovered into an initial working state, and when there is a user providing reverse power supply, reverse power supply is kept to finish a duty cycle.

From the above, the method of the present disclosure is an effective method used for implementing the coexistence of the POTS and reverse power supply on the twisted pair, and by the method, the physical division manner such as the time division manner, the frequency division manner and the space division manner is adopted to implement division and isolation of the POTS and the reverse power supply service between the DPU and the user network adapter in terms of working time. That is, the reverse power supply service is stopped during operation of the POTS; or division and isolation in terms of working frequency is implemented, namely converting the POTS into a local code and modulating the POTS into a local signal; or division and isolation in terms of working line space is implemented, namely transmitting the POTS through a dedicated voice twisted pair and transmitting the reverse power supply service through another data twisted pair, thereby implementing coexistence and compatibility of the POTS and the reverse power supply service on the twisted pair and simultaneously ensuring and providing a high-quality POTS and reverse power supply service between the DPU and the user network adapter.

Although the method of the present disclosure for implementing coexistence of the POTS and the reverse power supply service on the twisted pair has been explained and described, the present disclosure is obviously unlimited. Those skilled in the art may consider many corrected, modified, varied, replaced and equivalent contents without departing from the spirit and scope of the present disclosure determined in the appended claims.

Obviously, various physical division manners mentioned in the present disclosure are not limited to the manners mentioned in the embodiment. For example, in the embodiment of the time division manner, the standby battery of the DPU is adopted to provide reverse power supply, reverse power supply may also be provided by the user-end equipment through the standby battery or another manner, and time division work may further be implemented through the standby batteries of both the DPU and the user-end equipment.

For another example, in the embodiment of the time division manner, the local power taking manner or another power supply manner may be adopted to meet working requirements of reverse power supply, the POTS and the like between the DPU and the user-end equipment instead of the standby battery working mode.

For another example, in the embodiment of the frequency division manner, for working state signal conversion of the voice service between the DPU and the user network adapter, the voice service of the POTS telephone may also be locally converted through an alternating current or high-frequency signal.

For another example, in the embodiment of the frequency division manner, the reverse power supply for the DPU and the user network adapter may also be a reverse power supply by converting into an alternating current signal, thereby implementing division and isolation from the low-frequency signal such as a direct current standby detection voltage, a ringing signal and calling dialing of the POTS in terms of frequency.

For another example, in the embodiment of the space division manner, the POTS between the DPU and the user network adapter may be executed through the dedicated voice twisted pair, and the POTS telephone is directly connected with the DPU or voice switch of the PSTN in a manner of bypassing the DPU or the user network adapter, thereby implementing division and isolation from reverse power supply between the DPU and the user network adapter.

For another example, in the embodiment of the present disclosure, implementation modes and application scenes of system architecture and principle diagrams of the DPU and the user network adapter are not limited to descriptions in the embodiment obviously, and corresponding function components may also be added, reduced or modified according to different scenes and requirements. For example, the master control component is added into the user network adapter. For example, a function of the voice adaptation component of the system equipment is modified. For example, the user network adapter is split or combined into multiple matched terminals or gate equipment or the like.

Obviously, those skilled in the art should know that each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

From the above, by the embodiment and example implementation mode, the problem that the POTS and the reverse power supply service executed on the DPU by the user-side equipment, which are transmitted on the twisted pair, may not coexist in the related art is solved, and the effect of improving the user experience is further achieved.

What is claimed is:

1. A method for isolating services, comprising:
determining a physical division manner, used for service isolation, of a twisted pair connected between a Distributed Point Unit (DPU) on an access network side and a network adapter on a user side, wherein the physical division manner comprises at least one of: a time division manner, a frequency division manner and a line space division manner; and
performing, according to the determined physical division manner, isolation processing on a Plain Old Telephone Service (POTS) and a reverse power supply service executed on the DPU by user-side equipment, which are transmitted on the twisted pair;
wherein determining the physical division manner, used for the service isolation, of the twisted pair connected between the DPU on the access network side and the network adapter on the user side comprises: when there is merely one twisted pair between the DPU and the network adapter, determining the physical division manner to be the time division manner and/or the frequency division manner; and
when the physical division manner is determined to be the time division manner, performing, according to the determined physical division manner, isolation processing on the POTS and the reverse power supply service executed on the DPU by the user-side equipment, which are transmitted on the twisted pair comprises: judging whether there exists the POTS on the twisted pair or not when a judgment result is that there exists the POTS on the twisted pair, stopping the reverse power supply service until the POTS is ended; and/or, when the judgment result is that there is no the POTS on the twisted pair, recovering the reverse power supply service executed on the DPU by the user-side equipment.

2. The method as claimed in claim 1, wherein, when the physical division manner is determined to be the frequency division manner, performing, according to the determined physical division manner, isolation processing on the POTS and the reverse power supply service executed on the DPU by the user-side equipment, which are transmitted on the twisted pair comprises:
determining different working frequency bands for the POTS and the reverse power supply service executed on the DPU by the user-side equipment, which are transmitted on the twisted pair; and
performing isolation processing on the POTS and the reverse power supply service in a manner of bearing the POTS and the reverse power supply service in the different working frequency bands.

3. The method as claimed in claim 1, wherein determining the physical division manner, used for service isolation, of the twisted pair connected between the DPU on the access network side and the network adapter on the user side comprises:
when there are at least two twisted pairs between the DPU and the network adapter, determining the physical division manner to be the line space division manner.

4. The method as claimed in claim 3, wherein, when the physical division manner is determined to be the line space division manner, performing isolation processing on the POTS and the reverse power supply service according to the determined physical division manner comprises:
determining different twisted pairs for the POTS and the reverse power supply service; and
performing isolation processing on the POTS and the reverse power supply service in a manner of bearing the POTS and the reverse power supply service on the different twisted pairs.

5. The method as claimed in claim 1, before determining the physical division manner, used for the service isolation, of the twisted pair connected between the DPU on the access network side and the network adapter on the user side, further comprising:
monitoring the POTS and/or the reverse power supply service.

6. The method as claimed in claim 2, before determining the physical division manner, used for the service isolation, of the twisted pair connected between the DPU on the access network side and the network adapter on the user side, further comprising:
monitoring the POTS and/or the reverse power supply service.

7. A device for isolating services, comprising:
a determining component, configured to determine a physical division manner, used for service isolation, of a twisted pair connected between a Distributed Point Unit (DPU) on an access network side and a network adapter on a user side, wherein the physical division manner comprises at least one of: a time division manner, a frequency division manner and a line space division manner; and
a processing component, configured to perform, according to the determined physical division manner, isolation processing on a Plain Old Telephone Service (POTS) and a reverse power supply service executed on the DPU by user-side equipment, which are transmitted on the twisted pair;
wherein the determining component comprises: a first determining element, configured to, when there is merely one twisted pair between the DPU and the network adapter, determine the physical division manner to be the time division manner and/or the frequency division manner,
wherein the processing component comprises: a judging element, configured to, when the physical division manner is determined to be the time division manner, judge whether there exists the POTS on the twisted pair or not a stopping element, configured to, when a judgment result of the judging element is that there exists the POTS on the twisted pair, stop the reverse power supply service is stopped until the POTS is ended; and/or, a recovering element, configured to, when the judgment result of the judging element is that there is no the POTS on the twisted pair, recover the reverse power supply service executed on the DPU by the user-side equipment.

8. The device as claimed in claim 7, wherein the processing component comprises:
a second determining element, configured to, when the physical division manner is determined to be the frequency division manner, determine different working frequency bands for the POTS and the reverse power supply service executed on the DPU by the user-side equipment, which are transmitted on the twisted pair; and
a first processing element, configured to perform isolation processing on the POTS and the reverse power supply service in a manner of bearing the POTS and the reverse power supply service in the different working frequency bands.

9. The device as claimed in claim 7, wherein the determining component comprises:
a third determining element, configured to, when there are at least two twisted pairs between the DPU and the network adapter, determine the physical division manner to be the line space division manner.

10. The device as claimed in claim 9, wherein the processing component comprises:
a fourth determining element, configured to, when the physical division manner is determined to be the line space division manner, determine different twisted pairs for the POTS and the reverse power supply service; and
a second processing element, configured to perform isolation processing on the POTS and the reverse power supply service in a manner of bearing the POTS and the reverse power supply service on the different twisted pairs.

11. The device as claimed in claim 7, further comprising:
a monitoring component, configured to monitor the POTS and/or the reverse power supply service.

12. A Distributed Point Unit (DPU) comprising: the device for isolating services as claimed in claim 7.

13. A network adapter, comprising: the device for isolating services as claimed in claim 7.

14. A system for isolating services, comprising: a Distributed Point Unit (DPU) and a network adapter both comprising the device for isolating services as claimed in claim 7, and the twisted pair connected between the DPU and the network adapter.

* * * * *